(12) United States Patent
Tracey

(10) Patent No.: US 7,953,644 B2
(45) Date of Patent: May 31, 2011

(54) NETWORKING SYSTEM FOR REFERRALS

(75) Inventor: Timothy C. Tracey, West Hartford, CT (US)

(73) Assignee: Timothy C. Tracey, West Hartford, CT (US)

( * ) Notice: Subject to any disclaimer, the term of this patent is extended or adjusted under 35 U.S.C. 154(b) by 0 days.

(21) Appl. No.: 12/343,765

(22) Filed: Dec. 24, 2008

(65) Prior Publication Data
US 2009/0171808 A1 Jul. 2, 2009

Related U.S. Application Data

(60) Provisional application No. 61/016,898, filed on Dec. 27, 2007.

(51) Int. Cl.
*G06Q 30/00* (2006.01)
(52) U.S. Cl. .................. 705/26; 705/10; 705/39
(58) Field of Classification Search .................. 705/108, 705/26, 10, 39, 224
See application file for complete search history.

(56) References Cited

U.S. PATENT DOCUMENTS

| | | | | |
|---|---|---|---|---|
| 5,758,328 A | * | 5/1998 | Giovannoli | 705/26 |
| 5,842,178 A | * | 11/1998 | Giovannoli | 705/26 |
| 7,007,076 B1 | * | 2/2006 | Hess et al. | 709/219 |
| 7,016,877 B1 | * | 3/2006 | Steele et al. | 705/50 |
| 7,418,657 B2 | * | 8/2008 | Gorelick et al. | 715/234 |
| 2003/0069744 A1 | * | 4/2003 | Craig et al. | 705/1 |
| 2004/0073474 A1 | * | 4/2004 | Field et al. | 705/10 |
| 2004/0153352 A1 | * | 8/2004 | Berns et al. | 705/8 |
| 2006/0229998 A1 | * | 10/2006 | Harrison et al. | 705/78 |
| 2007/0214259 A1 | * | 9/2007 | Ahmed et al. | 709/224 |
| 2008/0005017 A1 | * | 1/2008 | Poster | 705/39 |
| 2008/0288408 A1 | * | 11/2008 | Jacobsen | 705/50 |

OTHER PUBLICATIONS

Tode, Chantal, Avon Banks on New Credit Card, Jan. 30, 2004, Cosmetics International, vol. 28, pp. 2.*
Bowen, Cathy, Playing it close to the vest, Nov. 2000, vol. 13, No. 8, pp. 70-76.*

* cited by examiner

*Primary Examiner* — Matthew S Gart
*Assistant Examiner* — Talia Crawley
(74) *Attorney, Agent, or Firm* — McCormick, Paulding & Huber, LLP.

(57) ABSTRACT

A networking system for referrals that connects businesses (vendor) with their customers (member) and potential customers (prospective member) across a network. Once a vendor has joined the network, the vendor may invite other members to join. A member can then refer a prospective member to the vendor. If the prospective member purchases goods or services from the vendor, the vendor will confirm the sale by paying a referral fee to the network. The network distributes said referral fee according to the connection relationship of the members of the network.

19 Claims, 11 Drawing Sheets

NETWORKING SYSTEM FOR REFERRALS

CROSS-REFERENCE TO RELATED APPLICATION

This application claims the benefit of U.S. Provisional Application Ser. No. 61/016,898, filed Dec. 27, 2007, incorporated by reference herein in its entirety.

FIELD OF THE INVENTION

This invention relates in general to a networking system for referrals. More particularly, the invention deals with a networking system for word-of-mouth-like referrals that connects businesses with their customers and potential customers.

BACKGROUND OF THE INVENTION

Businesses typically have many advertising options when attempting to generate new customers. However, many customers come from word-of-mouth referrals from current satisfied customers. In this way, these satisfied customers could be a business's most valuable asset.

Word-of-mouth referrals are advantageous over other types of advertising in several ways. First, word-of-mouth referrals require less time and money to convert to sales since these prospective customers already have a high level of trust in the business. Second, prospective customers from word-of-mouth sales have a higher chance of becoming actual customers when compared to other forms of advertising. Third, referred customers are more likely to become active referrers.

Other advertising choices include phone book advertising, newspapers, television, and radio. Consumers have used the Yellow Pages and other local advertising for decades to locate vendors. Unfortunately, these options are typically high cost with low differentiation and do not leverage a business's greatest asset, satisfied customers. In addition, these media cannot portray the quality that contractors, professionals, and businesses provide. Higher value service providers have no means of adequately differentiating themselves from other advertisers who are not as reliable.

The dozens of new Internet search engines have severely complicated local advertising options for most local businesses. Competitors are now buying services that continually place them ahead of trusted, established businesses at the top of search results. Many busy, established local business owners do not have the time or resources to stay on top of this growing trend.

The history of rating businesses' quality goes back to the Better Business Bureau's founding in 1912. More recent efforts have conglomerated the rating and comments of consumer about local businesses through the Internet. This approach generated several problems including lawsuits and complaints by Vendors over unfounded remarks and poor ratings. In addition, some raters establish false web identities to unfairly weigh the ratings of their companies and their competitors.

Thus, a business would benefit from increasing its word-of-mouth referrals in order to harness its most effective source of leads in developing new business.

Other online-based networking systems exist for word-of-mouth referrals. Even though many of these systems allow consumers to view the comments of others, these systems also charge consumers to view these ratings about vendors. Thus, consumers pay for access to the data and then for the product or service itself. Other networking systems also require vendors to pay a fixed price or a price based on acquisitions of potential customers. However, these prices are not based on actual sales, as vendors would prefer.

With the forgoing problems and concerns in mind, it is the general object of the present invention to provide a networking system for word-of-mouth-like referrals, which creates more effective advertising while incentivizing referrals.

SUMMARY OF THE INVENTION

It is an object of the present invention to provide a networking system for word-of-mouth-like referrals.

It is another object of the present invention to provide a networking system for word-of-mouth-like referrals that compensates people for making referrals.

It is another object of the present invention to provide a networking system for word-of-mouth-like referrals that increases a person's confidence and trust in a vendor because the vendor was recommended.

These and other objectives of the present invention, and their preferred embodiments, shall become clear by consideration of the specification, claims and drawings taken as a whole.

According to a first aspect of the present invention, a method for executing a computer program on a processor operated by a host to provide a referrals networking system is provided. The method comprises the steps of providing the computer program with a plurality of members related to one another through a plurality of connections, wherein at least one member is a vendor who offers to sell a purchasing opportunity, and wherein the members designate the vendors as trusted. Generating, for each member, a member page that contains a referral listing of the vendors that the member has designated as trusted, wherein the member page of the vendor also contains the purchasing opportunity. Referring, by one of the members, a prospective member to the member page of the trusted vendor using the computer program. Paying, by the vendor, a referral fee to the host to confirm that the prospective member accepted the purchasing opportunity contained on the member page of the vendor. And, allocating the referral fee to each of the host, the prospective member, and the members according to the connections between the members.

According to a second aspect of the present invention, a method for executing a computer program on a processor to provide a referrals networking system is provided. The method includes the steps of configuring the computer program with a referral distribution scheme including a retained percentage, a rebate percentage and a referral percentage. Providing the computer program with a plurality of members, wherein at least one member is a vendor who offers to sell a purchasing opportunity, and wherein the members designate the vendors as trusted. Generating, for each member, a member page that contains a referral listing of the vendors that the member has designated as trusted, wherein the member page of the vendor also contains the purchasing opportunity. Receiving, from a prospective member, a search query of the member page of the member to find the referral listing. Transmitting, to the prospective member, the web page of the trusted vendor to review the purchasing opportunities by navigating the referral listing. Receiving, from the vendor, payment of a referral fee to the computer program to confirm that the prospective member accepted the purchasing opportunity. And allocating the referral fee to each of the host according to the retained percentage, the prospective member according to the rebate percentage, and the member according to the referral percentage.

According to a third aspect of the present invention, a networking system is provided. The networking system includes a means for receiving data signals from a plurality of persons corresponding to each person's individual and business information including products and services offered thereby. Data storage means for storing signals received from said data input devices. A means for analyzing said stored signals and categorizing each person as either a vendor, member or prospective member. A means for generating solicitation signals from said stored vendor signals for presentation to said prospective members corresponding to an invitation to join the networking system. A means for generating, for those prospective members and members who accept said invitation, vendor connection signals indicative of a connection between said vender and said designated member or prospective member. A means for receiving signals from each of said vendors corresponding to a designated referral fee for each sale by said vendor to any of said members. A means for generating referral signals indicative of a referral chain of member to member referrals relative to a selected one of said vendors. And a means for assigning a portion of said referral fee to each of said members in said referred chain in dependence on a position of a respective one of said members in said referral chain.

DETAILED DESCRIPTION OF THE PREFERRED EMBODIMENT

The present invention provides a system for connecting a business to its community of referring clients, community, and contacts. The preferred embodiment shown in FIG. 1 can be configured using well known computer hardware and software including web browser software allowing for internet communication between the individuals as discussed hereinafter.

Figure 1:
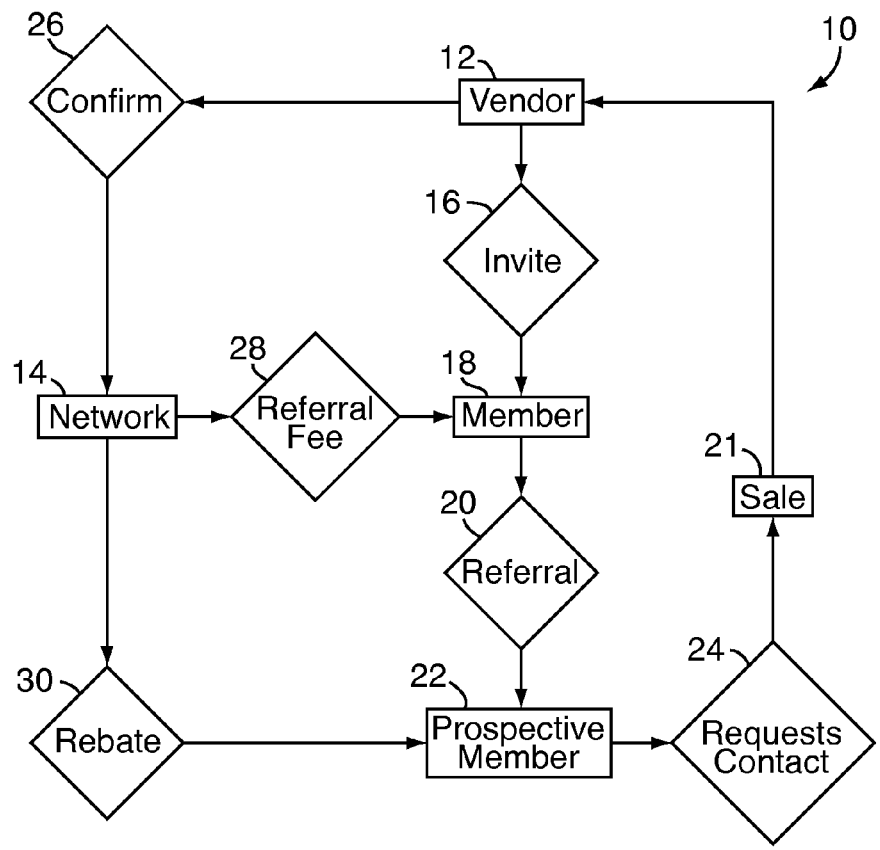
FIG. 1 is an exemplary flowchart summarizing a networking system for connecting a business to its community of referring clients and contacts, according to the present invention.
Figure 2:
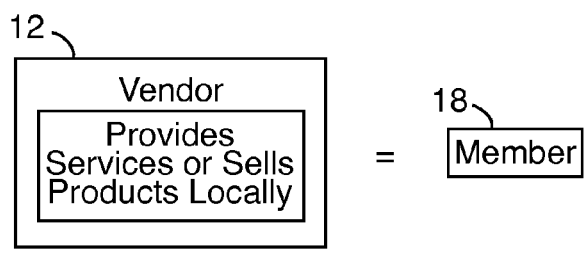
FIG. 2 is a flowchart illustrating that, according to the networking system of FIG. 1, a vendor is a member who, in addition, provides services or sells products locally.
Figure 3:
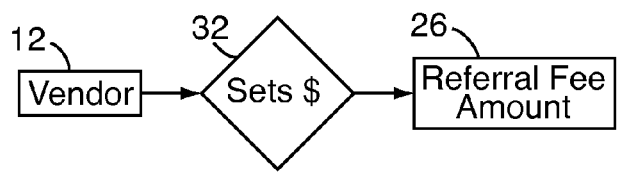
FIG. 3 is a flowchart illustrating that, according to the networking system of FIG. 1, a vendor sets the amount of referral fee that the vendor will pay for each new customer or lead that results in a sale.

FIG. 1 illustrates a networking system 10 for word-of-mouth-like referrals. In this embodiment, a vendor 12 registers itself as a member of a network 14. A vendor 12 shares all of the attributes of a member 18, but, as illustrated in FIG. 2, a vendor 12 also sells products or services, which corresponds with a series of specific distinctions discussed hereinafter. As illustrated in FIG. 3, the vendor 12, upon registering or as desired, sets (set referral fee step 32) the amount the vendor 12 will pay for each new customer or lead referred through the network 14 that results in a sale.

Figure 4:
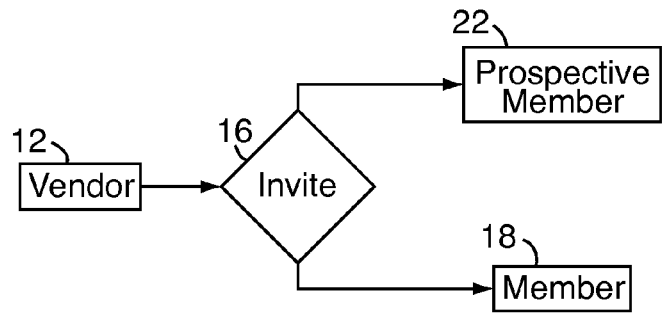
FIG. 4 is a flowchart illustrating that, according to the networking system of FIG. 1, a vendor can invite prospective members and members to join the network and establish a connection to the vendor.
Figure 5:
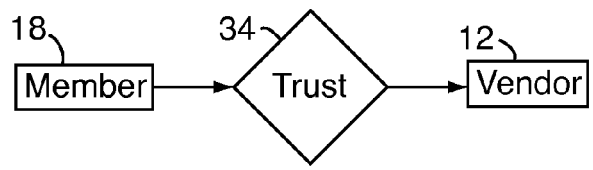
FIG. 5 is a flowchart illustrating that, according to the networking system of FIG. 1, a member can designate a vendor as trusted.

Referring to FIG. 4, after registering, the vendor 12 may invite its current customers and contacts to join the network 14 and/or connect to the vendor 12 through an invitation step 16. In the preferred embodiment, the invitation step 16 includes directing the vendor's customer or contact to vendor's 12 personal page. If the customer or contact accepts the invitation, then that person is invited to register with the network 14 as a member 18. Now, the vendor 12 and the member 18 are connected. Once connected, the member 18 may designate the vendor 12 as trusted as illustrated in FIG. 5.

Referring to FIG. 1, when a friend, customer, or contact of the member 18 asks about products or services offered by the vendor 12, the member 18 may refer the person to vendor 12 through a link from a cell phone, the member's network member page, email, or other known method (referral step 20). Upon clicking the link, the person associated with the member 18 becomes a prospective member 22. The prospective member 22 is invited to register with the network 14 and may request the vendor 12 to contact him or her (contact request step 24).

If the vendor 12 does work for the prospective member 22, shown as sale step 21, then the vendor 12 confirms the new customer (prospective member 22) and pays a referral fee to the network 14 (confirmation step 26). The network 14 retains a portion of the referral fee and distributes the remainder among the member 18 (referral fee distribution step 28) and the prospective member 22 (rebate distribution step 30) and other members connected to the transaction according to an algorithm that the network maintains.

Figure 6:
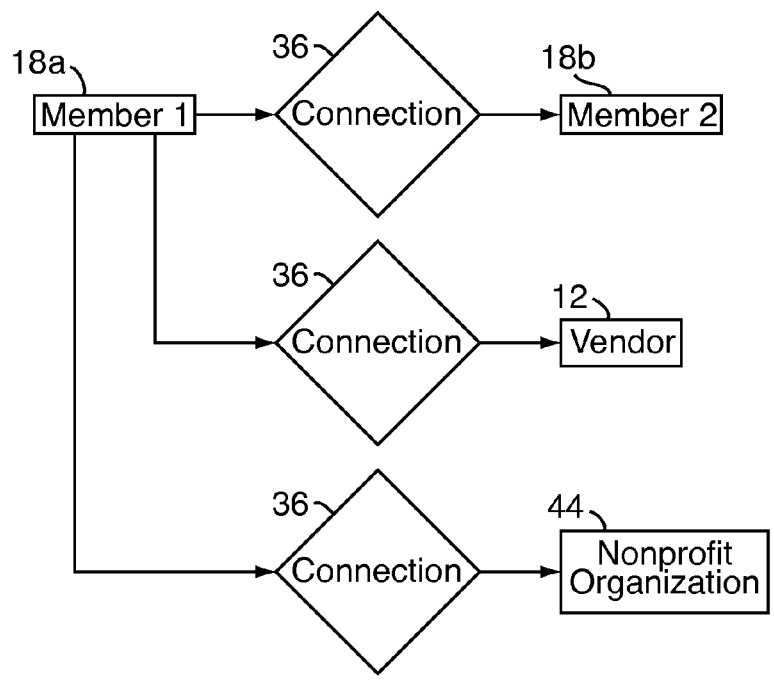
FIG. 6 is a flowchart illustrating that, according to the networking system of FIG. 1, a member can be connected to many persons through the network including another member, a vendor or a charity (non-profit organization).
Figure 7:
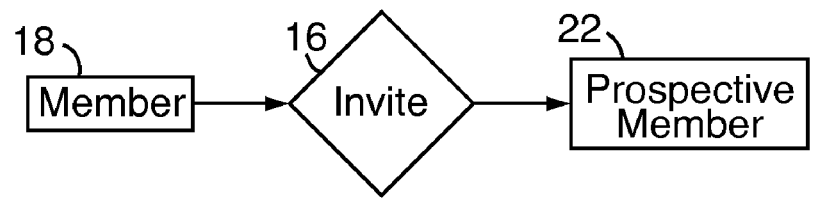
FIG. 7 is a flowchart illustrating that, according to the networking system of FIG. 1, a member can invite prospective members to join the network and establish a connection to the vendor.
Figure 8:
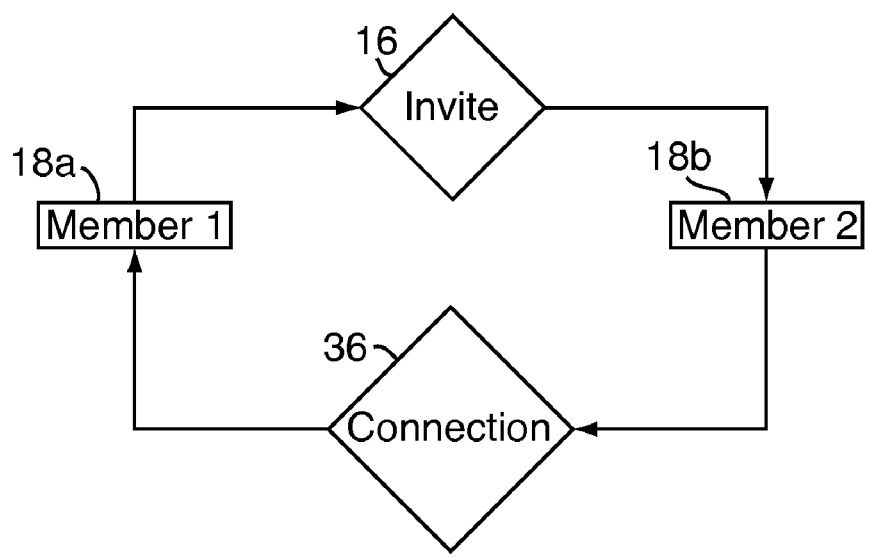
FIG. 8 is a flowchart illustrating that, according to the networking system of FIG. 1, a member can both invite and establish a connection with another member.

Referring to the networking system 10 in more depth, each member 18 (e.g., first member 18a) is related and connected (connection step 36) to other members (e.g., second member 18a), vendors 12, and/or charities 44 as illustrated in FIG. 6. Referring to FIG. 7, member 18 is able to invite non-members or a prospective member 22 via email, text messaging, or verbally through invitation step 16. This process can be done simultaneously with the referral step 20 or separately. When a non-member (or prospective member 22) is invited, the non-member may view the inviter's personal page that displays trusted vendors 12 and any relationship with charities. In addition, if the inviter is a vendor 12, the personal page may also include information about products and services that the vendor 12 offers, information about the amount the vendor 12 pays for referrals that result in sales, and links for members 18 to use to enter a referral to buy products or services. The non-member may also click a link to register and be connected with the member 18. The same invitation process (invitation step 16) can also be done between current members, for example, first member 18a and second member 18b, to establish connected relationship (connection step 36) as illustrated in FIG. 8. If the second member 18b accepts the invitation from first member 18a, then the first member 18a may view the second member 18b's network of trusted vendors, connect to said vendors and buy products or services from said vendors.

Figure 9:
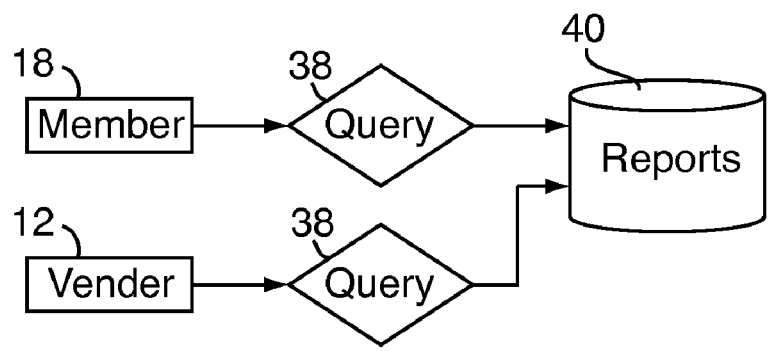
FIG. 9 is a flowchart illustrating that, according to the networking system of FIG. 1, a member, including a vendor, can query a report from the network to obtain information including the status of outstanding invitations, active leads, sales and inactive leads.
Figure 10:
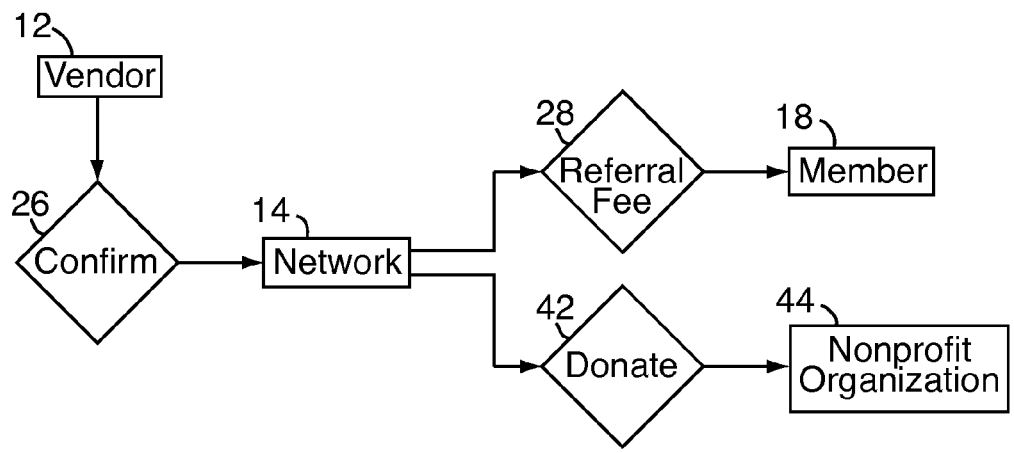
FIG. 10 is a flowchart illustrating that, according to the networking system of FIG. 1, upon the payment of a referral fee by a vendor to the network in confirmation of a sale, a member may either receive the referral fee in a distribution or designate that the referral fee be donated to a charity on the member's behalf.
Figure 11:
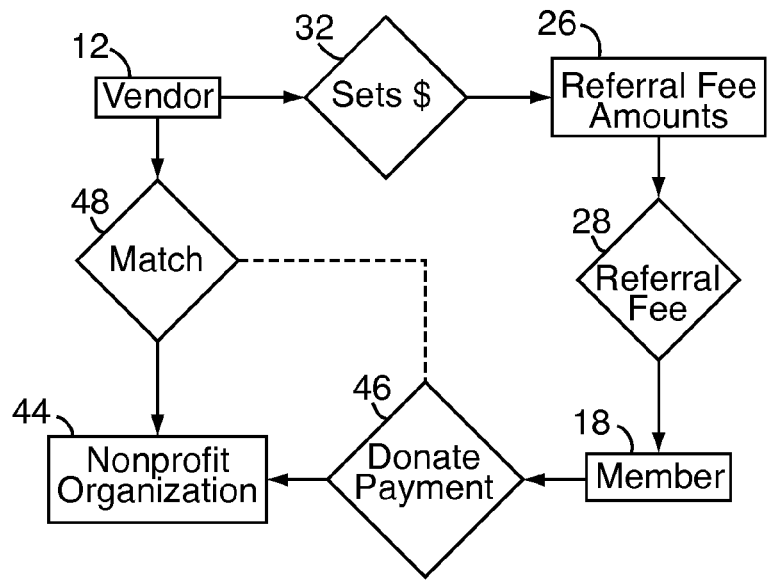
FIG. 11 is a flowchart illustrating that, in addition to designating or setting the referral fee amount as shown in FIG. 3, a vendor can designate a matching charitable contribution amount that the vendor is willing to pay to match a member's donation of the referral fee to a charity

Referring to FIG. 9, members 18, including vendors 12, are able to view the status of outstanding invitations to members and non-members, active leads, sales, and inactive leads, for example, by querying (query step 38) a report 40 with the desired information. Referring to FIG. 10, the member 18 may designate the referral fees that vendor 12 pays to network 14 in confirmation of a sale (confirm step 27), which are then distributed to the member 18 by distribution step 28, are paid to the member 18 via check or electronic means, or the member may designate through donate payment step 42 that the amount, either in part or in full, be paid to a charity 44 in the member's name. This donation may render the member 18 eligible for a tax credit or deduction. Moreover, as illustrated in FIG. 11, just as the vendor 12 can designate (set referral fee amount step 32) the amount of referral fee 26 that the vendor 12 is willing to pay upon a successful sale, the vendor 12 can designate (designate matching charitable contribution step 48) a matching charitable contribution percentage that will be paid to the charity 44 designated by the member 18 upon a payment of a referral fee to the member's 18 charity 44 resulting from the sale.

Figure 12:
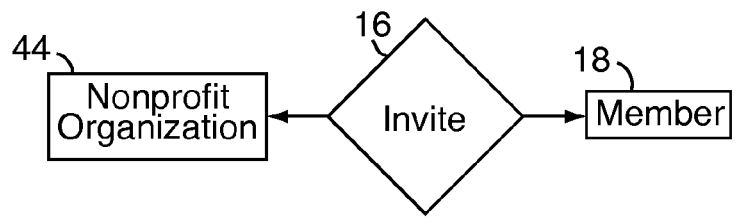
FIG. 12 is a flowchart illustrating that, according to the networking system of FIG. 1, a charity or non-profit organization can invite members to join the network and establish a connection to the vendor.
Figure 13:
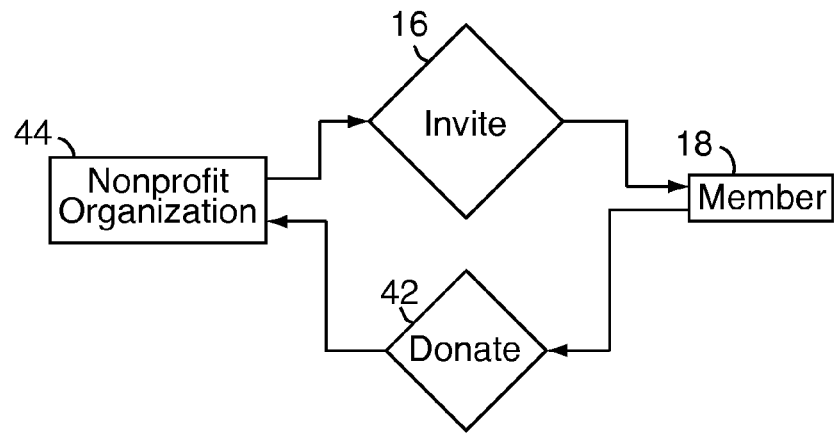
FIG. 13 is a flowchart illustrating that, according to the networking system of FIG. 1, in addition to accepting the charity's invitation as shown in FIG. 12, the member may designate the charity to receive a portion of the member's referral fees.

Charities are typically 501(c)(3) not-for-profit organizations. Charities may register with the network 14 as either a member or a vendor, and will share all of the common attributes of said group. For example, as illustrated in FIG. 12, charities 44 can also invite their supporters to join the networking system like any other member, and perform any other network-related operation provided herein. Accordingly, the processes described herein are the same for charities as for members and vendors. The charity would have a page on the network that displays information about the organization, a link to register, and links for members to enter a referral to buy products or services. Referring to FIG. 13, if the charity's supporters join, the charity 44 can invite its supporting members 18 to designate (donate payment step 42) the charity 44 to receive the referral fees that the member 18 receives.

Figure 14:
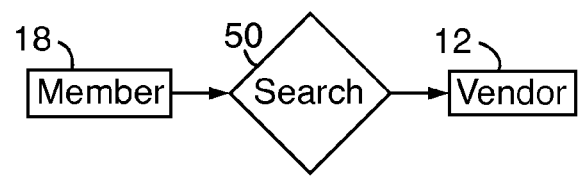
FIG. 14 is a flowchart illustrating that, in addition to the search capabilities of the networking system of FIG. 13, a member can search for vendors in the network using a variety of search criteria.
Figure 15:
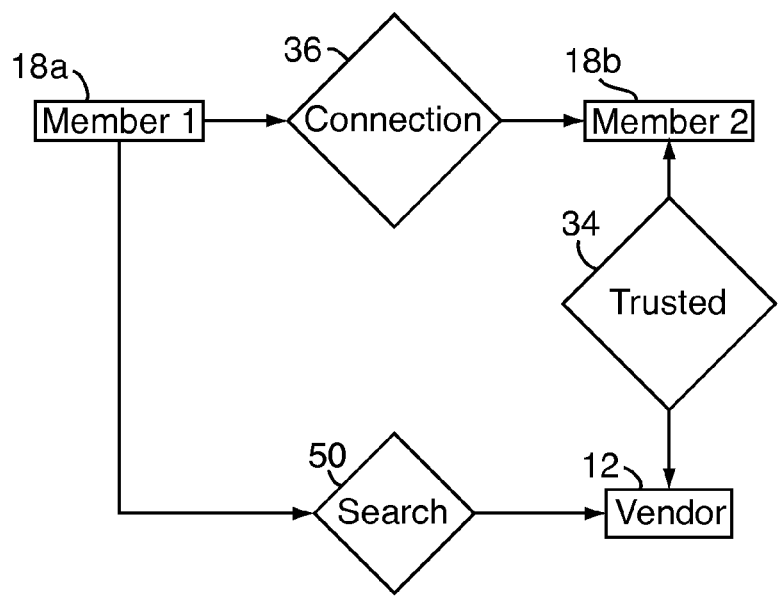
FIG. 15 is a flowchart illustrating that, according to the networking system of FIG. 1, a member can search for vendors who are trusted by another member to whom the member is connected.
Figure 16:
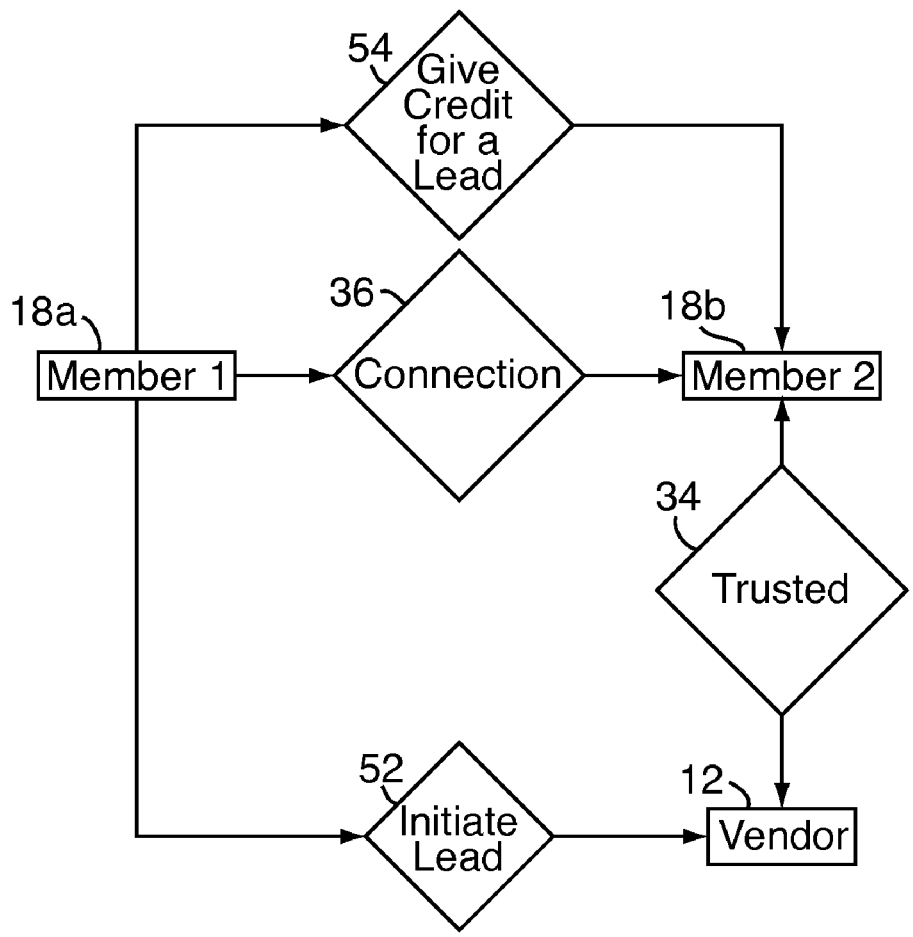
FIG. 16 is a flowchart illustrating that, according to the networking system of FIG. 1, once a vendor is identified as shown in FIG. 15, the member can either contact the vendor through the other member to whom the member is connected or initiate a lead with the vendor directly and give credit for the referral through the networking system.
Figure 17:
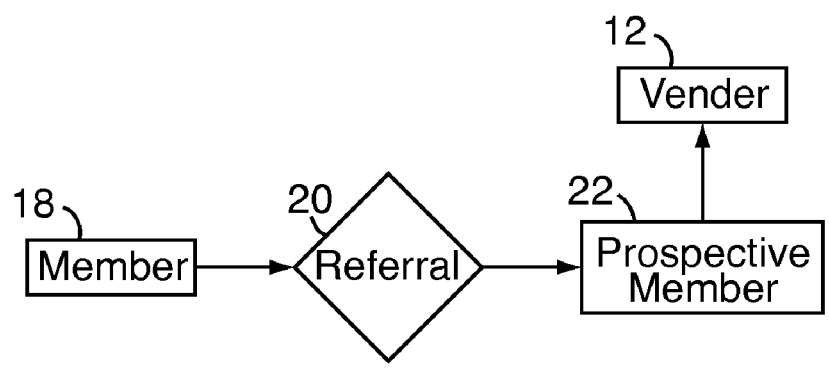
FIG. 17 is a flowchart illustrating that, according to the networking system of FIG. 1, a member can refer a vendor to a prospective member.

Referring to FIG. 14, when connecting with a vendor 12, the member 18 may search (search step 50) for a vendor 12 in the network 10 using various criteria such as location, service radius, industry code, referral fee amount, and matching charitable donation amounts. Referring to FIG. 15, the member (e.g., first member 18a) may also identify (search step 50) the vendors 12 who are trusted (trust step 34) by other members (e.g., second member 18b) connected (connection step 36) to the member 18a. Referring to FIG. 16, once the member 18a identifies a vendor 12 (e.g., through second member 18b), member 18a may initiate a lead (initiate lead step 52) with said vendors 12 by performing invitation step 16. Alternatively, the member 18a may purchase goods or services from vendor 12 and then give credit (give credit step 54) to the other member 18b for the referral. If the connection between member 18a and vendor 12 is formed, the other member 18b will be credited for the referral. Referring to FIG. 17, as an alternative, member 18 may initiate a "lead" with the vendor 12 to form a connection, for example, by referring (via e-mail, text messaging or verbally) (referring step 20) a prospective member 22 to contact vendors 12. If the referred prospective member 22 then accepts the referral by purchasing goods or services from the vendor 12 and, thus, connects to the vendor 12, then member 18 receives credit for the "lead."

Figure 18:
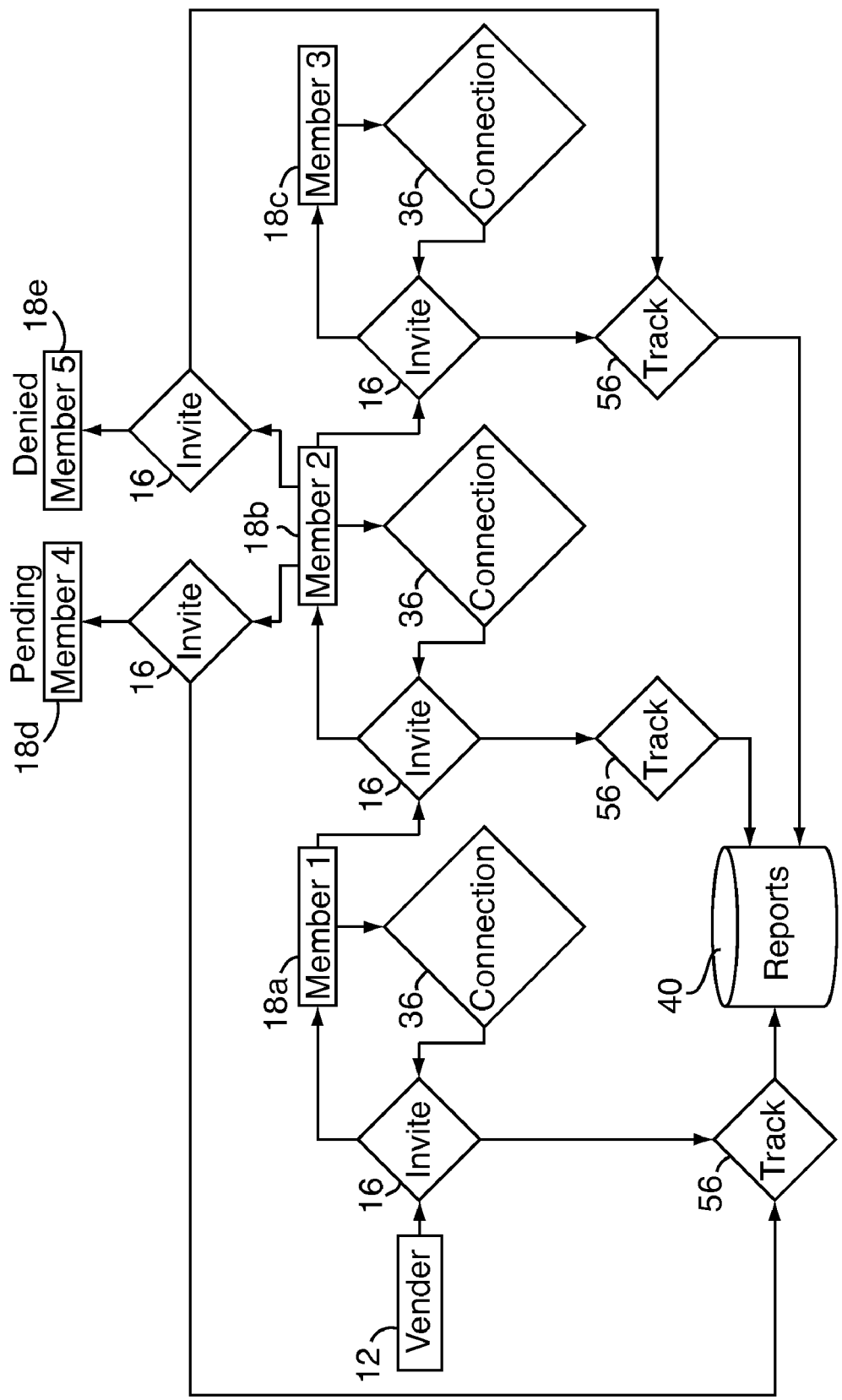
FIG. 18 is a flowchart illustrating a networking system according to the present invention that maintains a database of relationships that tracks all invitations by members as well as the hierarchy of relationships formed.
Figure 19:
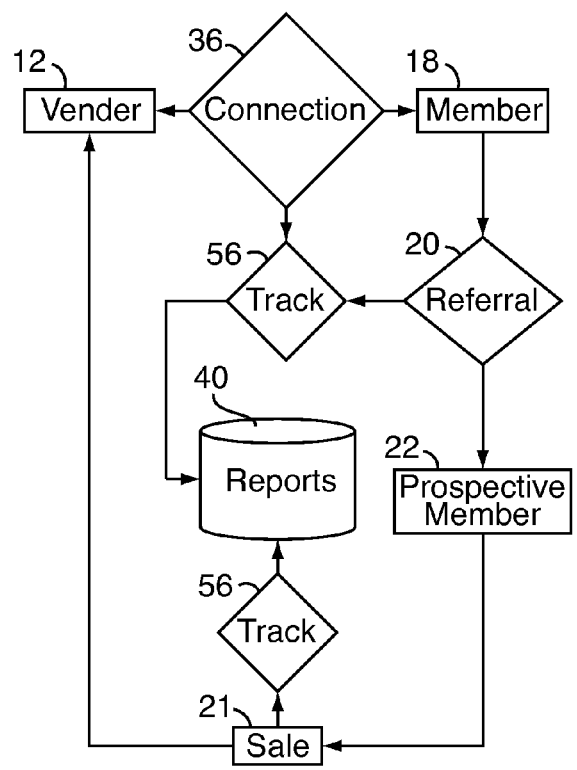
FIG. 19 is a flowchart illustrating that, according to the networking system of FIG. 18, the database also tracks all referrals and the status of the referrals.
Figure 20:
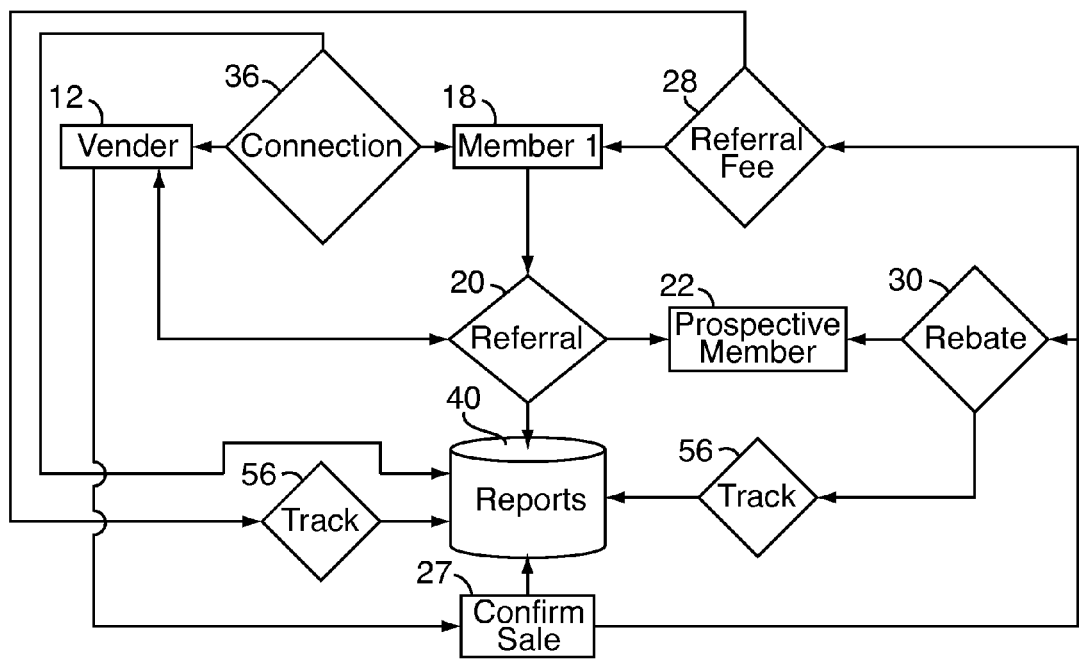
FIG. 20 is a flowchart illustrating that, according to the networking system of FIG. 18, the database also tracks the payment and distribution of the referral fee to members.

Referring to FIG. 18, the network 14 maintains a database of relationships that tracks (track transaction step 56) all invitations (invitation step 16) by members 18 and vendors 12 as well as the hierarchy of relationships, i.e., which members 18 and vendors 12 were invited or recruited by which members 18 or vendors 12, including the status of the invitation (e.g., whether the member 18 has accepted the invitation through connection step 36). Moreover, referring to FIG. 19, the database tracks (track transactional data step 56) all referrals by members 18, including the status of referrals and completed sales (e.g., whether the referral 20 has matured into a sale via sale step 21). The database also tracks (track transactional data step 56) all payments by vendors 12 to members 18, including record of referral payments to members 18 as well as charitable donations given on the behalf of referring members 18. As illustrated in FIG. 20, the database record includes all fund transfers to the purchasing member (prospective member 22), which are called "rebates" (rebate step 30), and transfers to the primary referring member(s) (first member 18a), which are called "referral fees" (referral fee step 28). The database record also includes transactions to the secondary referring member(s), for instance, transactions to the member who invited referring member or the prospective member to the network.

Figure 21:
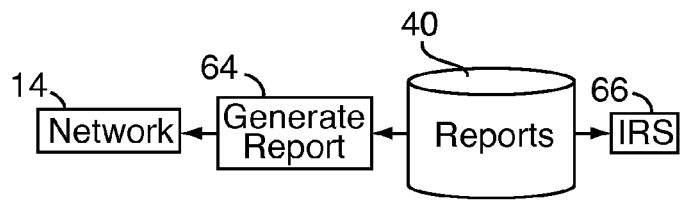
FIG. 21 is flowchart illustrating that the networking system according to the present invention generates reports that can be provided to organizations like the Internal Revenue Service.

In addition, referring to FIG. 21, the network generates (generate report step 64) tracking reports 40 based on the database record. These tracking reports can then be provided to organizations such as the Internal Revenue Service 66. This report can be used for tax purposes to properly deduct the charitable donations and include the referral payments, which are considered income other than wages, salaries, and tips that should be included on Tax Form 1099

Figure 22:
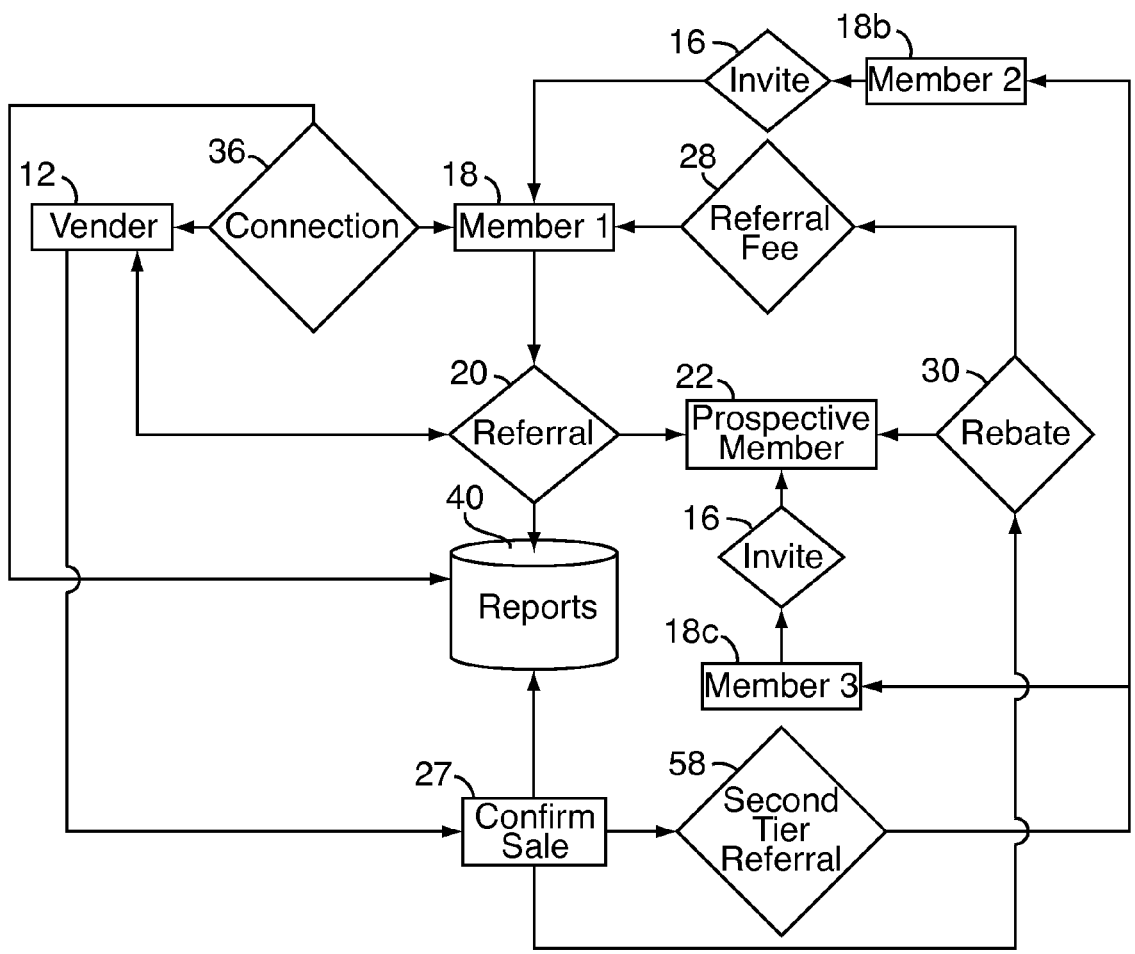
FIG. 22 is a flowchart illustrating that the networking system according to the present invention is capable of providing second tier referral fees to members.

Turning now to FIG. 22, the networking system 10 is also capable of providing second tier referral fees to members 18 or charities that invited a prospective member 22 or the member 18a that makes a referral to the prospective member 22 that results in a sale. In this embodiment, the second member 18b invites the first member 18a through the invitation step 16. The first member 18a accepts the invitation and decides to become connected with the vendor 12 that the second member 18b trusts through a connection step 36. Also, the third member 18c invites the prospective member 22 to join the network through invitation step 16 and prospective member 22 accepts.

Still referring to FIG. 22, the first member 18a then refers the prospective member 22 to the vendor 12 through the referral step 20. If the referral results in a sale, then the vendor 12 confirms the sale and pays a referral fee to the network through the confirmation step 27. Some of this referral fee is distributed to the first member 18a as a referral fee through the referral fee distribution step 28. Some of this referral fee is also distributed to the prospective member 22 as a rebate through the rebate fee distribution step 30. Finally, a portion of the referral fee is distributed to the member 18 as a second tier referral through a second tier referral distribution step 58. The second tier referral is given to the second and third members 18b, 18c since the third member 18c invited prospective member 22 and the second member 18b invited first member 18a, who gave a referral to the prospective member 22 that resulted in a sale. The status of connections 36, referrals 20, and vendor payments 26 are all tracked in reports 40 on the database of network.

Figure 23:
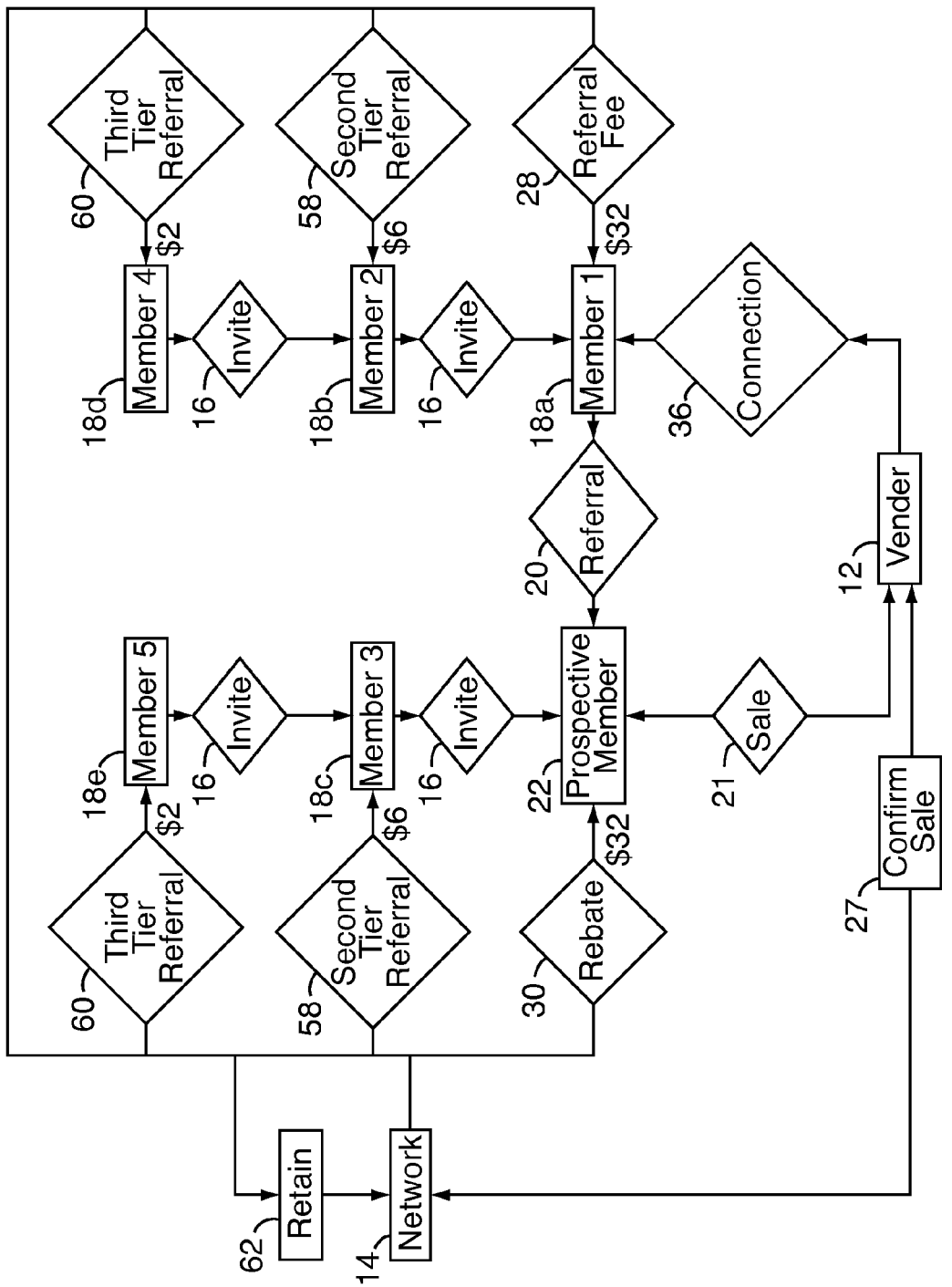
FIG. 23 is a flowchart illustrating the networking system according to the present invention, its interconnections, and an example of a distribution of the referral fee.

FIG. 23 illustrates the full connection possibilities of the networking system 10. The fifth member 18e invites the third member 18c through an invitation step 16. In turn, third member 18c invites a prospective member 22 through an invitation step 16. Another member, fourth member 18d, invites the second member 18b through an invitation step 16. In turn, second member 18b invites a first member 18a through an invitation step 16. First member 18a connects with a vendor 12 that the member 18a trusts through the connection step 36. Member 18a also refers member 22 to vendor 12 through the referral step 20. This referral results in a sale between member 22 and vendor 12 (sale step 21).

As a result of the sale, the vendor 12 pays a referral fee to the network 14. For this example and as shown in FIG. 23, the vendor 12 has designated a $100 referral fee per referred sale. In this example, the network 14 retains $20 of the $100 (retain fee step 62). The remainder is distributed through the networking system 10 according to connections between members. In this case, member 18a receives a referral fee of $32 for referring member 22b to vendor 12 (referral fee distribution step 28). Likewise, member 22 receives a rebate of $32 for conducting a sale with vendor 12 (rebate distribution step 30). Member 18b receives a second tier referral fee of $6 for inviting member 22d (second tier referral fee distribution step 58), and member 18d receives a third tier referral fee of $2 for inviting member 18b (third tier referral fee distribution step 60). Similarly, member 18c receives a second tier referral of $6 for inviting member 22b, and member 18e receives a third tier referral of $2 for inviting member 18c. These tiers of referral fees and rebates can be continued indefinitely or within a limit set by the networking system 10.

Figure 24:
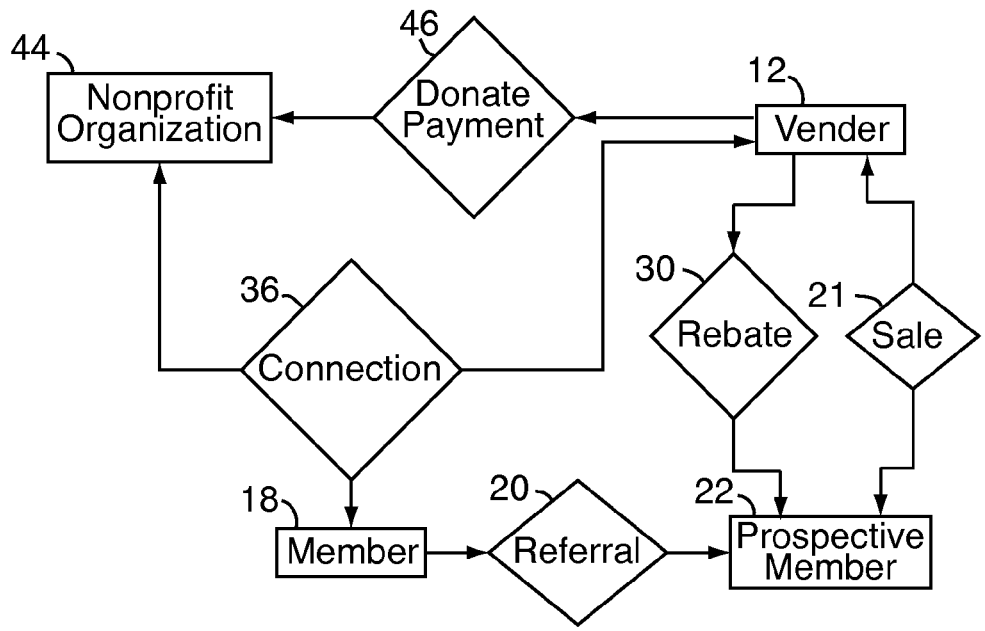
FIG. 24 is a flowchart illustrating that, according to the networking system of the present invention, during a distribution of the referral fee, a member's referral fee can be donated to a charity.

As will be appreciated, any of the referrals or rebates, either in part or in full, may be designated to a charity on behalf of the member. For example, as shown in FIG. 24, member 18 has designated referral payments for leads resulting in a sale are to be paid, e.g., in full, by the network 14 to a charity to whom member 18 is connected (connecting step 36). Member 18 is connected to vendor 12 who member 18 has designated as a trusted vendor. In this example, member 18 refers prospective member 22 to trusted vendor 12, and prospective member 22 accepts the referral by purchasing goods or services from vendor 12. As a result of the sale 21, vendor 12 makes a referral fee payment (confirmation step 27) to the network 14. The network 14 then distributes the referral fee. Member 22 receives a rebate for conducting a sale with vendor 12 (rebate distribution step 30). Member 18, however, does not receive a referral fee. Instead, because member 18 designated charity 44 to receive all of member 18's referral fees, network 14 transfers the referral fee to charity 44 directly via donating step 46.

Figure 25:
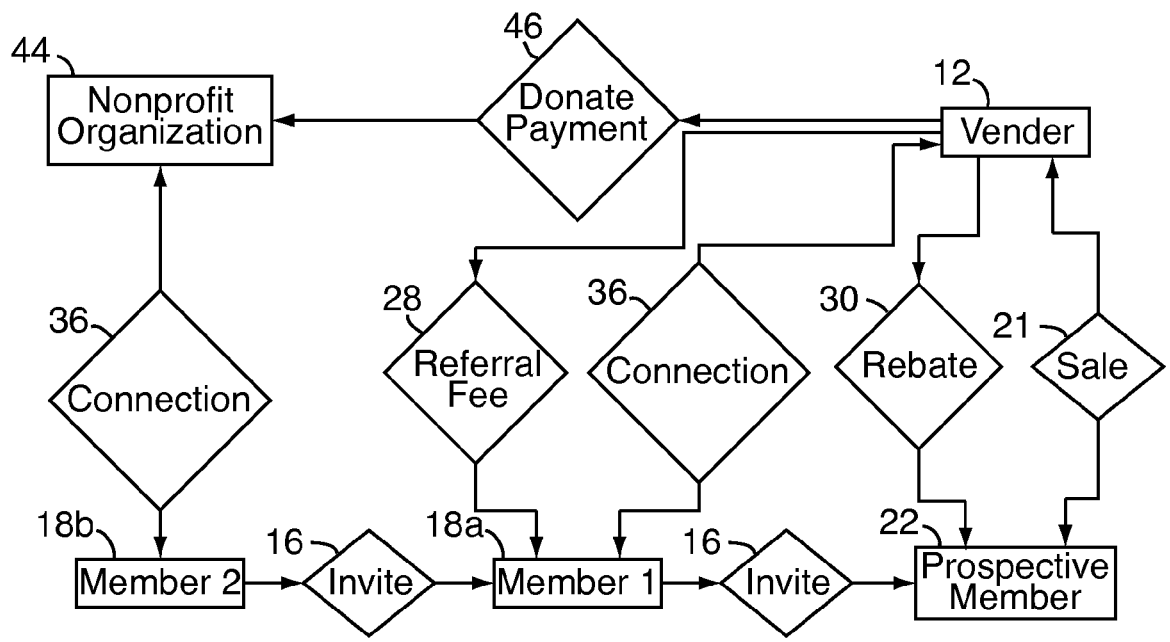
FIG. 25 is a flowchart illustrating that, according to the networking system of the present invention, during a distribution of the referral fee, a member's second tier referral fee can be donated to charity.

As will be appreciated, the example shown in FIG. 24 is equally applicable where a second member 18b, rather than a direct referring member 18a, has designated a charity 44 to receive payment of leads and referral fees. Referring to FIG. 25, second member 18b has designated referral payments for leads resulting in a sale are to be paid, e.g., in full, by the network 14 to a charity 44 through donation step 46. Second member 18b invites member 18 to join the network via invitation step 16. Member 18 identifies and connects to vendor 12 who member 18 designates as a trusted vendor 12. In this example, member 18 refers prospective member 22 to vendor 12, and prospective member 22 accepts the referral by purchasing goods or services from vendor 12. As a result of the sale 21, vendor 12 makes a referral payment to the network 14. As was the case in the scenario of FIG. 24, member 22 receives a rebate for conducting a sale with vendor 12 (rebate distribution step 30). Member 18 receives a referral fee payment via referral fee distribution step 28. And, in this example, member 18b does not receive a referral fee. Instead, because member 18b designated charity to receive all of member 18b's referral fees, the network 14 transfers the secondary referral fee to charity 44 (donation step 46).

As will be appreciated by consideration of the embodiments illustrated in the Figures, the present invention provides a networking system for word-of-mouth-like referrals. This system provides more effective advertising by using existing clients and contacts while incentivizing referrals. Unlike other networking systems, members do not pay to view other recommendations. Rather, members are paid in referral fees or rebates for any sales made, which encourages members to refer others and make connections. Also, unlike other networking systems, vendors pay only when a sale is made rather than paying a fixed price or a price based on an acquisition of a potential customer. Thus, the present invention provides a networking system for word-of-mouth-like referrals that is heretofore unknown in the art.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments. For example, in addition to the computer hardware and software detailed herein above, those skilled in the art will note that the present system can be implemented on conventional wireless communication devices such as "Blackberry" or "IPhone" brand devices interfacing with known, communication systems wireless and across a local area network.

What is claimed is:

1. A method for executing a computer program on a processor operated by a host to provide a referrals networking system comprising the steps of:
   gathering, by a processor, electronic data associated with a plurality of members providing, by said processor, the computer program with a plurality of members related to one another through a plurality of connections, wherein at least one member is a vendor who offers for sale a purchasing opportunity, and wherein at least one of the members designates at least one of the vendors as trusted;
   generating, by said processor, for each member, a member page that contains a referral listing of the vendors that the member has designated as trusted, wherein the member page of the vendor also contains the purchasing opportunity;
   receiving, by said processor, from referring, by one of the members, a request to refer a prospective member to the member page of the trusted vendor;
   receiving, by said processor, from transferring, by the vendor, a referral fee, wherein the receipt of the referral fee confirms that the prospective member completed accepted the purchasing opportunity contained on the member page of the vendor; and
   allocating, by said processor, portions of the referral fee to each of the host, the prospective member and at least one of the members;
   wherein the portions of the referral fee depend in dependence on the connections between the members;
   wherein a first portion of the referral fee is allocated to the host, a second portion of the referral fee is allocated to the prospective member and a third portion of the referral fee is allocated to the members; and
   wherein the referral fee is received and allocated after the prospective member completes the purchasing opportunity of the vendor.

2. The method for referrals according to claim 1, wherein at least one of the members is a charity; and the method further comprising the steps of:
   receiving, from one of the members, a designation of the charity to receive a percentage of each referral fee transferred to the one of the members; and
   when the one of the members is allocated the portion of the referral fee, allocating the percentage of the portion of the referral fee to the charity on the behalf of the one of the members.

3. The method for referrals according to claim 2, further comprising the steps of:
   receiving, from the vendor, a designation of a matching charitable contribution amount;
   providing the member page of the vendor with the matching charitable contribution amount;
   wherein the step of receiving the referral fee further comprises:
      receiving, from the vendor, the lesser of the matching charitable contribution amount or the amount the prospective member designates to the charity; and
   wherein the step of allocating the referral fee further comprises:
      allocating to the charity the lesser of the matching charitable contribution amount or the amount the prospective member designates to the charity.

4. The method for referrals according to claim 1 further comprising the steps of:
   receiving, from a prior member, an invitation for the member to join the networking system;
   receiving, from the member, an acceptance of the prior member's invitation which forms a connection between the member and the prior member; and
   allocating a first portion of the referral fee to the member according to a first tier referral percentage and a second portion of the referral fee to the prior member according to a second tier referral percentage.

5. The method for referrals according to claim 4, further comprising:
   receiving, from a second prior member, an invitation for the prospective member to join the networking system;
   allocating the portion of the referral fee to the second prior member according to the second tier referral percentage.

6. The method for referrals according to claim 1, further comprising the step of:
   receiving, from the vendor, a specification of the referral fee.

7. The method for referrals according to claim 1, further comprising the step of:
   recording to a storage unit of the networking system information pertaining to a transaction, wherein the transaction is selected from the group consisting of:
   the member joining the networking system, the member connecting to another member, the member qualifying as the vendor, the member designating the vendor as trusted, the member referring the vendor, the member qualifying as a charity, the member designating a percentage of the portion of the referral fee to be received by the charity on the behalf of the member, the vendor specifying the purchasing opportunities, the vendor specifying the referral fee for the purchasing opportunities, the vendor specifying a matching charitable contribution amount, the prospective member viewing the purchasing opportunity, the prospective member completing the purchasing opportunity, the prospective member connecting to the member, the vendor transferring the referral fee to the networking system to confirm that the prospective member completed the purchasing opportunity, and the networking system allocating portions of the referral fee to the vendor, the prospective member and the members.

8. The method for referrals according to claim 7, further comprising the step of:
   searching the storage unit for information pertaining to the transactions.

9. The method for referrals according to claim 7, further comprising the step of:
   producing reports based on the transactions recorded in the storage unit.

10. The method for referrals according to claim 9, wherein the reports that are produced are tax or accounting related documents.

11. A method for executing a computer program on a processor operated by a host to provide a referrals networking system comprising the steps of:
   configuring the computer program with a referral distribution scheme including a retained percentage, a rebate percentage a referral percentage;
   gathering, by a processor, electronic data associated with providing the computer program with a plurality of members, wherein at least one member is a vendor who offers for sale a purchasing opportunity;
   receiving, by said processor, from one of the plurality of designated, based on input from the members, a designation of the at least one vendor as trusted;
   generating, by said processor, for each member, a member page that contains a referral listing of the vendors that the member has designated as trusted, wherein the member page of the vendor also contains the purchasing opportunity;
   receiving, from a prospective member, a search query of the member page of the member to find the referral listing;
   transmitting, by said processor, to the prospective member, the member page of the trusted vendor to review the purchasing opportunities by navigating the referral listing;
   receiving, by said processor, from the vendor, payment of a referral fee to the computer program to confirm that the prospective member completed the purchasing opportunity; and
   allocating poitions, by said processor, of the referral fee to each of the host according to the retained percentage, the prospective member according to the rebate percentage and the member according to the referral percentage;
   wherein the referral fee is received and allocated after the prospective member completes the purchasing opportunity with said vendor.

12. The method for referrals according to claim 11, wherein:
   receiving, from the vendor, vendor data including: an industry code, a location, a service radius, a referral fee amount, a matching charitable contribution amount and a connection with a member in the networking system; and
   receiving, from the prospective member, a search query for the purchasing opportunities based on the vendor data.

13. The method for referrals according to claim 11:
   wherein the prospective member is connected to a plurality of members including the member who invited the prospective member to the networking system; and
   receiving, from the prospective member, a search query for the purchasing opportunities based on the posted referral listings of all members to whom the prospective member is connected.

14. A networking system comprising:
   means for receiving data signals from a plurality of persons corresponding to each person's individual and/or business information including products and services offered thereby;
   data storage means for storing signals received from said data input devices;
   means for analyzing said stored signals and categorizing each person as a vendor, a member and/or a prospective member;
   means for generating solicitation signals from said stored signals of said vendor for presentation to one of said persons corresponding to an offer for sale of said products and/or services of said vendor;
   means for generating, for those persons who accept said invitation, vendor connection signals indicative of a connection between said vendor and said persons;
   means for receiving signals from each of said vendors corresponding to a designated referral fee for each sale by said vendor to one of said prospective members;
   means for generating referral signals indicative of a referral chain of person-to-person referrals relative to said vendor;
   means for assigning portions of said referral fee to said persons in said referral chain in dependence on a position of a respective one of said persons in said referral chain; and
   means for retaining another portion of said referral fee for said networking system;
   wherein a first portion of said referral fee is assigned to at least one of said members, a second portion of said referral fee is assigned to said prospective member and said another portion of said referral fee is retained by the networking system; and
   wherein said referral fee is received, assigned and retained after said sale between said vendor and said one of said prospective members is completed.

15. The networking system according to claim 14 further comprising:
   means for receiving signals from each person corresponding to a designation of a charity and of a percentage of any referral fees assigned to said person to be donated to said charity on the behalf of said person;
   means for analyzing said stored signals and categorizing each person as a charity; and
   means for assigning said percentage of said portion of said referral fee to said charity on the behalf of each of said persons in said referral chain.

16. The networking system according to claim 14 further comprising:
   means for generating connection signals from at least one of said members to at least one of said vendors for presentation to said persons corresponding to an indication of trust that said one of said prospective members can utilize in contemplating said offer for sale of said vendor.

17. The method for referrals according to claim 1, further comprising the step of:
   receiving, from the prospective member, a request to be contacted by the vendor; and
   transmitting, to the vendor, the request.

18. The method for referrals according to claim 11, further comprising the step of:
   receiving, from the prospective members, a request to be contacted by the vendor; and
   transmitting, to the vendor, the request.

19. The networking system according to claim 14 further comprising:
  means for receiving signals from said persons corresponding to a request to be contacted by at least one of said vendors; and
  means for generating signals to the at least one of said vendors based on the request.

* * * * *

UNITED STATES PATENT AND TRADEMARK OFFICE
CERTIFICATE OF CORRECTION

| | | |
|---|---|---|
| PATENT NO. | : 7,953,644 B2 | Page 1 of 1 |
| APPLICATION NO. | : 12/343765 | |
| DATED | : May 31, 2011 | |
| INVENTOR(S) | : Timothy C. Tracey | |

It is certified that error appears in the above-identified patent and that said Letters Patent is hereby corrected as shown below:

On the title page:

Item (73), please delete the Assignee:
"Timothy C. Tracey, West Hartford, CT (US)".

Signed and Sealed this
Thirty-first Day of January, 2012

David J. Kappos
*Director of the United States Patent and Trademark Office*